US011499628B2

(12) United States Patent
Jeong et al.

(10) Patent No.: US 11,499,628 B2
(45) Date of Patent: Nov. 15, 2022

(54) APPARATUS FOR CONTROLLING SHIFTING OF A VEHICLE AND A METHOD THEREFOR

(71) Applicants: HYUNDAI MOTOR COMPANY, Seoul (KR); KIA CORPORATION, Seoul (KR)

(72) Inventors: Dong Hoon Jeong, Hwaseong-si (KR); Byeong Wook Jeon, Seoul (KR); Yong Uk Shin, Seongnam-si (KR); Min Jae Chai, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 16 days.

(21) Appl. No.: 17/354,763

(22) Filed: Jun. 22, 2021

(65) Prior Publication Data

US 2022/0178439 A1 Jun. 9, 2022

(30) Foreign Application Priority Data

Dec. 7, 2020 (KR) ........................ 10-2020-0169808

(51) Int. Cl.
*F16H 61/02* (2006.01)
*F16H 59/14* (2006.01)
*F16H 59/18* (2006.01)
*F16H 59/44* (2006.01)
(Continued)

(52) U.S. Cl.
CPC ....... *F16H 61/0213* (2013.01); *F16H 59/141* (2013.01); *F16H 59/18* (2013.01); *F16H 59/44* (2013.01); *F16H 59/70* (2013.01);
*F16H 2059/366* (2013.01); *F16H 2059/706* (2013.01); *F16H 2061/022* (2013.01); *F16H 2061/0216* (2013.01)

(58) Field of Classification Search
CPC .......... F16H 59/18; F16H 59/44; F16H 59/70; F16H 59/141; F16H 2059/366; F16H 2059/706; F16H 61/0213; F16H 2061/0216; F16H 2061/022; F16H 2061/0223
See application file for complete search history.

(56) References Cited

U.S. PATENT DOCUMENTS 5,540,632 A * 7/1996 Lardy ..................... F16H 61/66
477/43
2006/0048516 A1* 3/2006 Tenbrock ............... B60W 10/11
60/698

(Continued)

*Primary Examiner* — Edwin A Young
(74) *Attorney, Agent, or Firm* — Lempia Summerfield Katz LLC (57) ABSTRACT

An apparatus for controlling shifting of a vehicle and a method therefor are provided, where the apparatus includes a storage storing a power map in which a demand power corresponding to a vehicle speed and an accelerator position sensor (APS) value is recorded and storing an energy consumption map of a power source for each gear stage. The apparatus includes a controller that detects a current demand power based on the power map, generates a power graph representing the detected demand power as the number of revolution and a torque of the power source for each gear stage, and matches the generated power graph with the energy consumption map of the power source to control a shift to a gear stage which consumes minimum energy.

15 Claims, 10 Drawing Sheets

(51) Int. Cl.
*F16H 59/70* (2006.01)
*F16H 59/36* (2006.01)

(56) References Cited

U.S. PATENT DOCUMENTS

| 2014/0244082 A1* | 8/2014 | Caron | B60K 23/08 |
| | | | 290/40 R |
| 2015/0345621 A1* | 12/2015 | Sujan | F16H 59/74 |
| | | | 701/58 |

* cited by examiner

APPARATUS FOR CONTROLLING SHIFTING OF A VEHICLE AND A METHOD THEREFOR

CROSS-REFERENCE TO RELATED APPLICATION

This application claims the benefit of priority to Korean Patent Application No. 10-2020-0169808, filed in the Korean Intellectual Property Office on Dec. 7, 2020, the entire contents of which are incorporated herein by reference.

TECHNICAL FIELD

The present disclosure relates to technologies of controlling upshift or downshift to a gear stage, which minimally consumes energy of a power source (e.g., an engine or a motor) based on a demand power.

BACKGROUND

In general, a vehicle has a transmission, which adjusts a driving speed of the vehicle using engine power. Such a transmission is classified as a manual transmission adjusted by a driver or an automatic transmission automatically adjusted according to a driving speed of the vehicle. The automatic transmission is installed between an output shaft of an internal combustion engine of the vehicle and an axle to automatically adjust a shift ratio depending on the amount of accelerator manipulation or a driving speed of the vehicle.

An existing technology of controlling shift of the vehicle controls the shift of the vehicle based on a shift pattern corresponding to a vehicle speed and the amount of accelerator pedal (an accelerator position sensor (APS) value). In this case, to prevent a busy shift phenomenon in which two gear stages are repeatedly shifted, the existing technology separately has an upshift pattern used to increase a gear stage and a downshift pattern used to decrease a gear stage.

When such an existing technology is applied to, for example, a six-stage transmission, it should have a default shift pattern (composed of five upshift patterns and five downshift patterns) and should further have dozens of shift patterns depending on a driving condition (e.g., a grade, an altitude, a drive mode, or the like).

Thus, because the existing technology should have hundreds of upshift patterns and downshift patterns, there is a need for a time taken to perform many tests and it is difficult to implement shift control logic.

Details described in the background art are written to increase the understanding of the background of the present disclosure, which may include details rather than an existing technology well known to those having ordinary skill in the art.

SUMMARY

The present disclosure has been made to solve the above-mentioned problems occurring in the prior art while advantages achieved by the prior art are maintained intact.

An aspect of the present disclosure provides an apparatus for controlling shifting of a vehicle for detecting a current demand power based on a map in which a demand power corresponding to a vehicle speed and an accelerator position sensor (APS) value is recorded. The apparatus is also for generating a graph representing the detected demand power as a revolution per minute (RPM) and a torque of a power source for each gear stage. The apparatus is also for matching the generated graph with an energy consumption map of the power source to control shift to a gear stage which consumes minimum energy to prevent a busy shift phenomenon without the necessity of having a plurality of shift patterns and a method therefor.

The technical problems to be solved by the present disclosure are not limited to the aforementioned problems. Any other technical problems not mentioned herein should be clearly understood from the following description by those having ordinary skill in the art to which the present disclosure pertains. Furthermore, it may be easily understood that purposes and advantages of the present disclosure may be implemented by means indicated in the claims and a combination thereof.

According to an aspect of the present disclosure, an apparatus for controlling shifting of a vehicle may include a storage storing a power map in which a demand power corresponding to a vehicle speed and an accelerator position sensor (APS) value is recorded and an energy consumption map of a power source for each gear stage. The apparatus may also include a controller that detects a current demand power based on the power map, generates a power graph representing the detected demand power as a revolution per minute (RPM) and a torque of the power source for each gear stage, and matches the generated power graph with the energy consumption map of the power source to control a shift to a gear stage which consumes minimum energy.

In an embodiment of the present disclosure, the controller may maintain a current gear stage or may finally control a shift to a lower gear stage, based on a potential power ratio indicating the ratio of the demand power to a maximum power at a current RPM, before controlling the shift to the gear stage which consumes the minimum energy.

In an embodiment of the present disclosure, the controller may calculate the potential power ratio in a downshift situation.

In an embodiment of the present disclosure, the controller may maintain the current gear stage, when the potential power ratio is not greater than a first threshold Th1.

In an embodiment of the present disclosure, the controller may control a shift to a gear stage below one stage from the current gear stage, when the potential power ratio is greater than a first threshold Th1. The controller may also control a shift to a gear stage below at least two stages from the current gear stage, when the potential power ratio is greater than a second threshold Th2 (where Th1<Th2).

In an embodiment of the present disclosure, the power map may include at least one of: a graph indicating a relationship between the vehicle speed and the demand power, when the APS value is 5%; a graph indicating a relationship between the vehicle speed and the demand power, when the APS value is 10%; a graph indicating a relationship between the vehicle speed and the demand power, when the APS value is 20%; a graph indicating a relationship between the vehicle speed and the demand power, when the APS value is 40%; a graph indicating a relationship between the vehicle speed and the demand power, when the APS value is 60%; a graph indicating a relationship between the vehicle speed and the demand power, when the APS value is 80%; or a graph indicating a relationship between the vehicle speed and the demand power, when the APS value is 100%.

In an embodiment of the present disclosure, the controller may generate a graph corresponding to a third APS value located between a first APS value and a second APS value, based on a graph corresponding to the first APS value and a graph corresponding to the second APS value.

In an embodiment of the present disclosure, the energy consumption map of the power source may include a plurality of energy graphs which indicate different energies without being overlapped with each other.

According to another aspect of the present disclosure, a method for controlling shifting of a vehicle may include storing, by a storage, a power map in which a demand power corresponding to a vehicle speed and an accelerator position sensor (APS) value is recorded and an energy consumption map of a power source for each gear stage. The method may include detecting, by a controller, a current demand power based on the power map. The method may include generating, by the controller, a power graph representing the detected demand power as a revolution per minute (RPM) and a torque of the power source for each gear stage. The method may include matching, by the controller, the generated power graph with the energy consumption map of the power source to control a shift to a gear stage which consumes minimum energy.

In an embodiment of the present disclosure, the controlling of the shifting may include maintaining a current gear stage or finally controls a shift to a lower gear stage, based on a potential power ratio indicating the ratio of the demand power to a maximum power at a current RPM, before controlling the shift to the gear stage which consumes the minimum energy.

In an embodiment of the present disclosure, the final controlling of the shifting may include calculating the potential power ratio in a downshift situation; maintaining the current gear stage, when the potential power ratio is not greater than a first threshold Th1; and controlling a shift to a gear stage below one stage from the current gear stage, when the potential power ratio is greater than the first threshold Th1.

In an embodiment of the present disclosure, the final controlling of the shifting may further include controlling a shift to a gear stage below at least two stages from the current gear stage, when the potential power ratio is greater than a second threshold Th2 (where Th1<Th2).

In an embodiment of the present disclosure, the method may further include generating, by the controller, a graph corresponding to a third APS value located between a first APS value and a second APS value, based on a graph corresponding to the first APS value and a graph corresponding to the second APS value.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiments of the present disclosure, a detailed description of well-known features or functions has been omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component and the terms do not limit the nature, sequence or order of the constituent components. Unless otherwise defined, all terms used herein, including technical or scientific terms, have the same meanings as those generally understood by those having ordinary skill in the art to which the present disclosure pertains. Such terms as those defined in a generally used dictionary should be interpreted as having meanings equal to the contextual meanings in the relevant field of art. Such terms should not be interpreted as having ideal or excessively formal meanings unless clearly defined as having such in the present application. When a component, device, element, or the like of the present disclosure is described as having a purpose or performing an operation, function, or the like, the component, device, or element should be considered herein as being "configured to" meet that purpose or to perform that operation or function. The component, device, or element may separately embody or be included with a processor and a memory, such as a non-transitory computer readable media, as part of the apparatus.

Figure 1:
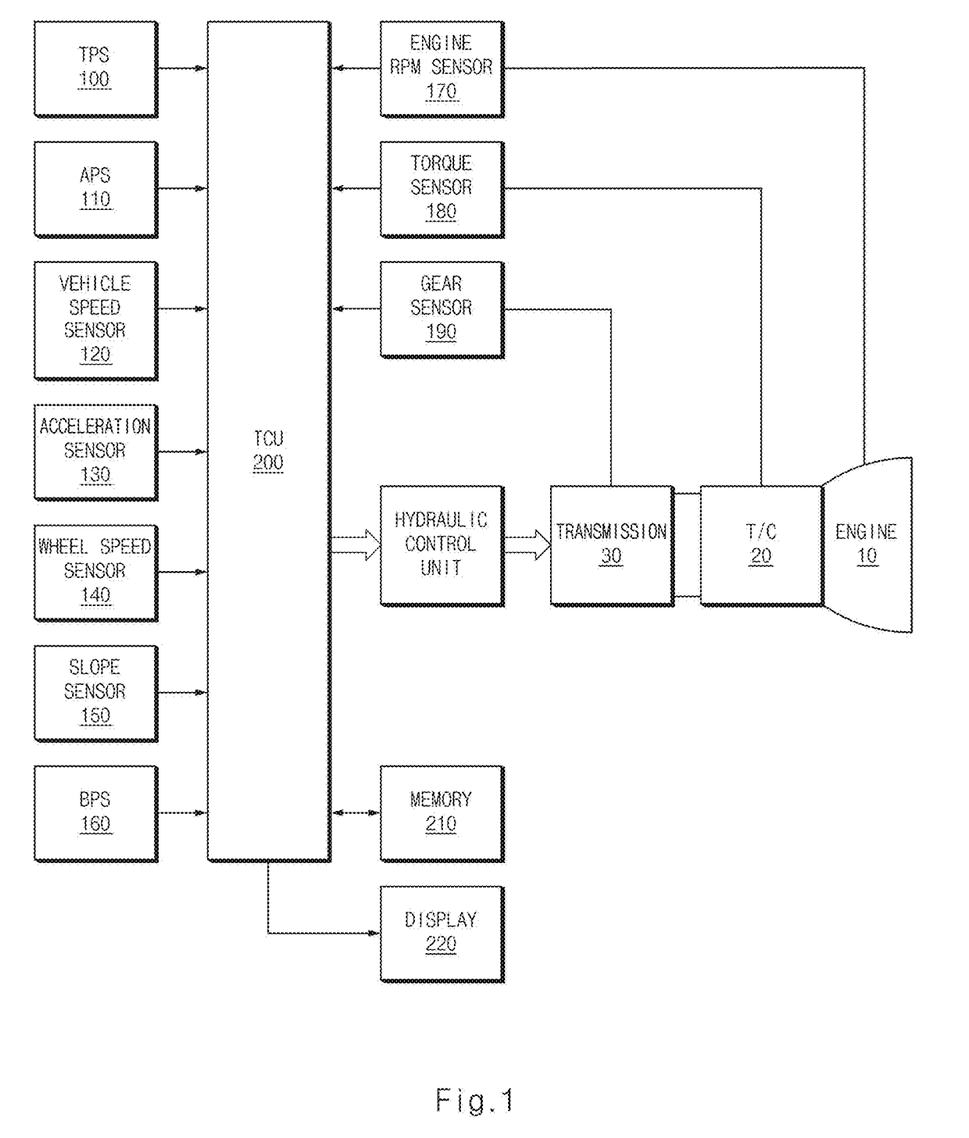
FIG. 1 is a block diagram illustrating a system for controlling shifting of a vehicle to which embodiments of the present disclosure are applied.

FIG. 1 is a block diagram illustrating a system for controlling shifting of a vehicle to which embodiments of the present disclosure are applied. In these embodiments, a power source is an engine 10, i.e., an internal combustion engine. However, it should be understood that it is applicable in the same manner when the power source is a motor, i.e., an electric motor.

As shown in FIG. 1, the system for controlling the shifting of the vehicle to which embodiments of the present disclosure are applied may include a throttle position sensor (TPS) 100, an accelerator position sensor (APS) 110, a vehicle speed sensor 120, an acceleration sensor 130, a wheel speed sensor 140, a slope sensor 150, a brake position sensor (BPS) 160, an engine revolution per minute (RPM) sensor 170, a torque sensor 180, a gear sensor 190, a transmission control unit (TCU) 200, a memory 210, and a display 220.

Seeing the respective components, first of all, the TPS 100 may sense a throttle position according to an opening and closing amount of a throttle valve of an engine 10 to generate a throttle position sensing signal according to the throttle position. The APS 110 may sense an accelerator position according to a manipulation state of an accelerator pedal of a driver to generate an accelerator position sensing signal according to the accelerator position. The vehicle speed sensor 120 may sense a vehicle speed according to driving of the vehicle to generate a vehicle speed sensing signal according to the vehicle speed. The acceleration sensor 130 may sense a change in acceleration according to driving of the vehicle to generate an acceleration sensing signal according to the change in acceleration. The wheel speed sensor 140 may sense a wheel speed (a speed of a wheel) according to driving of the vehicle to generate a wheel speed sensing signal according to the wheel speed. The slope sensor 150 may sense a slope of a vehicle body according to hill driving of the vehicle to generate a slope sensing signal according to the slope of the vehicle body. The BPS 160 may sense a manipulation state of a brake pedal of the driver to generate a brake position sensing signal according to the manipulation state of the brake pedal. The engine RPM sensor 170 may sense a rotary RPM according to running of the engine 10 to generate an RPM sensing signal according to the rotary RPM. The torque sensor 180 may sense a rotational torque of a torque converter (T/C) 20 combined between the engine 10 and a transmission 30 to generate a torque sensing signal according to the rotational torque of the T/C 20. The gear sensor 190 may sense a manipulation state of a gear stage according to shift of the transmission 30 to generate a gear stage sensing signal according to the manipulation state of the gear stage.

Meanwhile, to control shift of the vehicle, the TCU 200 may receive the throttle position sensing signal from the TPS 100, the accelerator position sensing signal from the APS 110, the vehicle speed sensing signal from the vehicle speed sensor 120, the acceleration sensing signal from the acceleration sensor 130, the wheel speed sensing signal from the wheel speed sensor 140, the slope sensing signal from the slope sensor 150, the brake position sensing signal from the BPS 160, the RPM sensing signal from the engine RPM sensor 170, the torque sensing signal from the torque sensor 180, or the gear stage sensing signal from the gear sensor 190.

The TCU 200 may collect data for identifying a road state and a driving state of the vehicle by means of the sensing signal from each sensor and may analyze the collected data to classify information. In this case, driving information data analyzed by the collected data may include an opening and closing amount of the throttle valve, a position of an accelerator, a current gear engaging state of the transmission 30, a vehicle speed, acceleration, an engine RPM, an average vehicle speed, a difference in wheel RPM of a wheel, a slope of the vehicle, an operational period of a brake, a required amount of torque of the engine 10, or the like. The TCU 200 may perform gear up/down shift depending on a predetermined shift pattern (or shift line) based on the analyzed driving information data. The memory 210 may store a shift pattern by a manual shift command by the driver, a shift pattern by a shift protection command, a shift pattern of a class defined by a shift of a class mode, or driving information data corresponding to the shift pattern of the class. The display 220 may display a shift progress state by applying a current shift pattern under control of the TCU 200 such that the driver may identify the shift progress state.

The above-mentioned system for controlling the shifting of the vehicle may control the shifting of the vehicle based on a shift pattern (in a general manner). When a manner according to an embodiment of the present disclosure is applied, which is described below, the system for controlling the shifting of the vehicle may control shifting of the vehicle in a demand power manner rather than the shift pattern manner.

Figure 2:
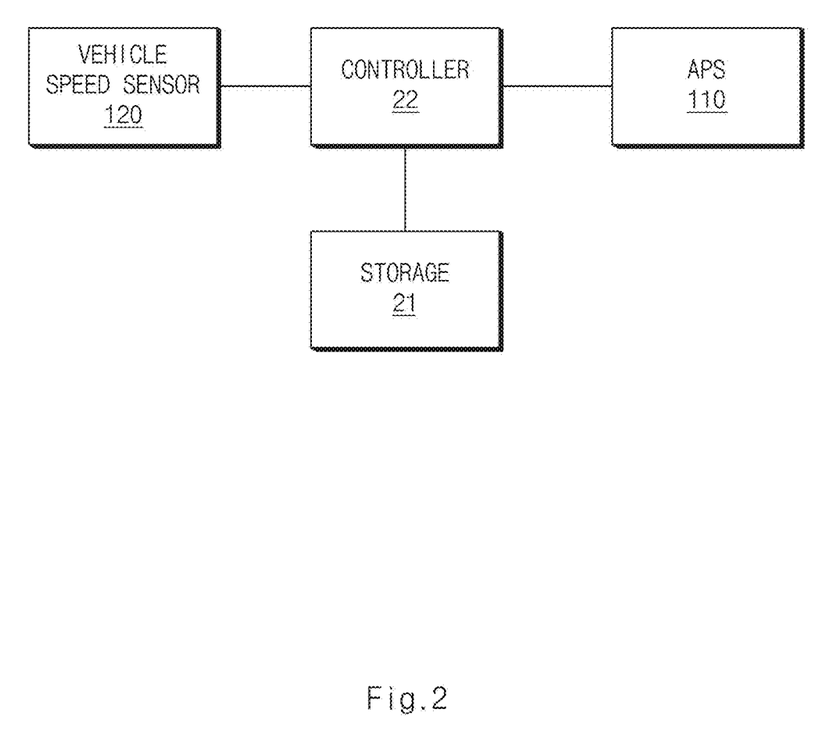
FIG. 2 is a block diagram illustrating a configuration of an apparatus for controlling shifting of a vehicle according to an embodiment of the present disclosure.

FIG. 2 is a block diagram illustrating a configuration of an apparatus for controlling shifting of a vehicle according to an embodiment of the present disclosure.

As shown in FIG. 2, the apparatus for controlling the shifting of the vehicle according to an embodiment of the present disclosure may include a storage 21, an APS 110, a vehicle speed sensor 120, and a controller 22. In this case, the respective components may be combined into one component and some components may be omitted, depending on a manner which executes the apparatus for controlling the shifting of the vehicle according to an embodiment of the present disclosure.

Referring to the respective components, first of all, the storage 21 may be implemented as a memory 210 of FIG. 1 and may store various logics, algorithms, and programs required in a process. The process may include detecting a current demand power based on a map in which a demand power corresponding to a vehicle speed and an APS value is recorded. The process may also include generating a graph indicating a RPM and a torque of a power source for each gear stage. The process may also include matching the generated graph with an energy consumption map of the power source to control a shift to a gear stage which consumes minimum energy.

The storage 21 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

Figure 3:
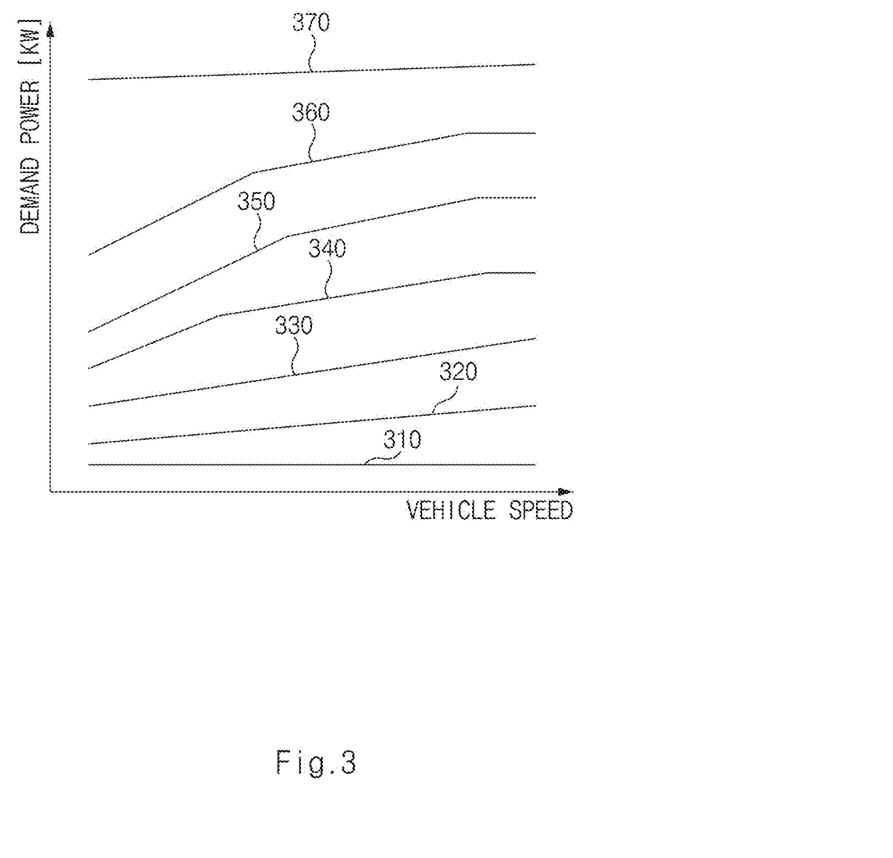
FIG. 3 is a drawing illustrating a power map stored in a storage provided in an apparatus for controlling shifting of a vehicle according to an embodiment of the present disclosure.

As shown in FIG. 3, such a storage 21 may store a map in which a demand power corresponding to a vehicle speed and an APS value is recorded.

FIG. 3 is a drawing illustrating a power map stored in a storage provided in an apparatus for controlling shifting of a vehicle according to an embodiment of the present disclosure.

In FIG. 3, the horizontal axis indicates the vehicle speed kph and the vertical axis indicates the demand power kW. Reference numeral '310' is the graph indicating the relationship between the vehicle speed and the demand power, when the output value of the APS 110 (hereinafter referred to as "APS value") is 5%. Reference numeral '320' is the graph indicating the relationship between the vehicle speed and the demand power, when the APS value is 10%. Reference numeral '330' is the graph indicating the relationship between the vehicle speed and the demand power, when the APS value is 20%. Reference numeral '340' is the graph indicating the relationship between the vehicle speed and the demand power, when the APS value is 40%. Reference numeral '350' is the graph indicating the relationship between the vehicle speed and the demand power, when the APS value is 60%. Reference numeral '360' is the graph indicating the relationship between the vehicle speed and the demand power, when the APS value is 80%. Reference numeral '370' is the graph indicating the relationship between the vehicle speed and the demand power, when the APS value is 100%.

The seven APS values are exemplified in FIG. 3. However, a graph may be included indicating the relationship between the vehicle speed and the demand power when the APS value is 30%. A graph may be included indicating the relationship between the vehicle speed and the demand power when the APS value is 50%. A graph may be included indicating the relationship between the vehicle speed and the demand power when the APS value is 70%. A graph may be included indicating the relationship between the vehicle speed and the demand power when the APS value is 90%. Also, an intermediate value may be calculated by calculation (e.g., an interpolation method). For example, a controller 22 of FIG. 2 may identify the relationship between the vehicle speed and the demand power, when the APS value is 70%, using the graph 350 and the graph 360. For another example, the controller 22 may identify the relationship between the vehicle speed and the demand power, when the APS value is 75%, using the graph 350 and the graph 360.

Figure 4:
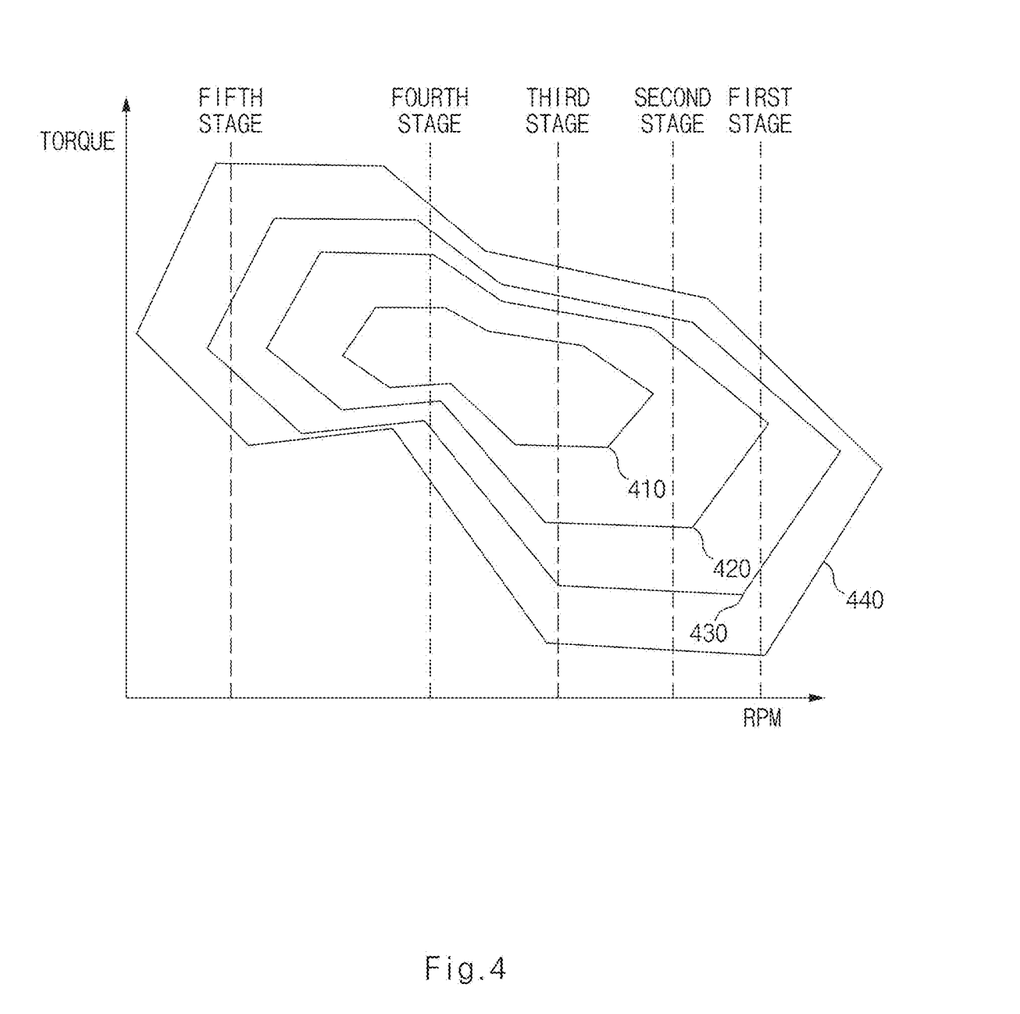
FIG. 4 is a drawing illustrating an energy consumption map of a power source stored in a storage provided in an apparatus for controlling shifting of a vehicle according to an embodiment of the present disclosure.

Meanwhile, the storage 21 may store an energy consumption map of the power source for each gear stage as shown in FIG. 4.

FIG. 4 is a drawing illustrating an energy consumption map of a power source stored in a storage provided in an apparatus for controlling shifting of a vehicle according to an embodiment of the present disclosure.

In FIG. 4, the horizontal axis indicates the RPM of the power source and the vertical axis indicates the torque of the power source. Reference numeral '410' is the graph indicating energy (e.g., 330 kJ/s) consumed in the third stage and the fourth stage according to the RPM and torque of the power source. Reference numeral '420' is the graph indicating energy (e.g., 340 kJ/s) consumed in the first stage, the second stage, the third stage, and the fourth stage according to the RPM and torque of the power source. Reference numeral '430' is the graph indicating energy (e.g., 350 kJ/s) consumed in all stages according to the RPM and torque of the power source. Reference numeral '440' is the graph indicating energy (e.g., 360 kJ/s) consumed in all stages according to the RPM and torque of the power source. Such an energy consumption map of the power source for each gear stage may vary with a type and performance of the power source.

A controller 22 of FIG. 2 may perform the overall control such that respective components may normally perform their own functions. Such a controller 22 may be implemented in the form of hardware, may be implemented in the form of software, or may be implemented in the form of a combination thereof. In an embodiment, the controller 22 may be implemented as, but not limited to, a microprocessor.

In an embodiment, the controller 22 may perform a variety of control required in a process. The process may also include detecting a demand power corresponding to a vehicle speed sensed by a vehicle speed sensor 120 of FIG. 2 and an APS value sensed by an APS 110 of FIG. 2 based on the power map stored in a storage 21 of FIG. 2. The process may also include generating a graph representing the detected demand power as an RPM and a torque of the power source for each gear stage. The process may also include matching the generated graph with an energy consumption map of the power source stored in the storage 21 to control shift to a gear stage which consumes minimum energy.

Hereinafter, the operation of the controller 22 is described in detail with reference to FIGS. 5 and 6.

Figure 5:
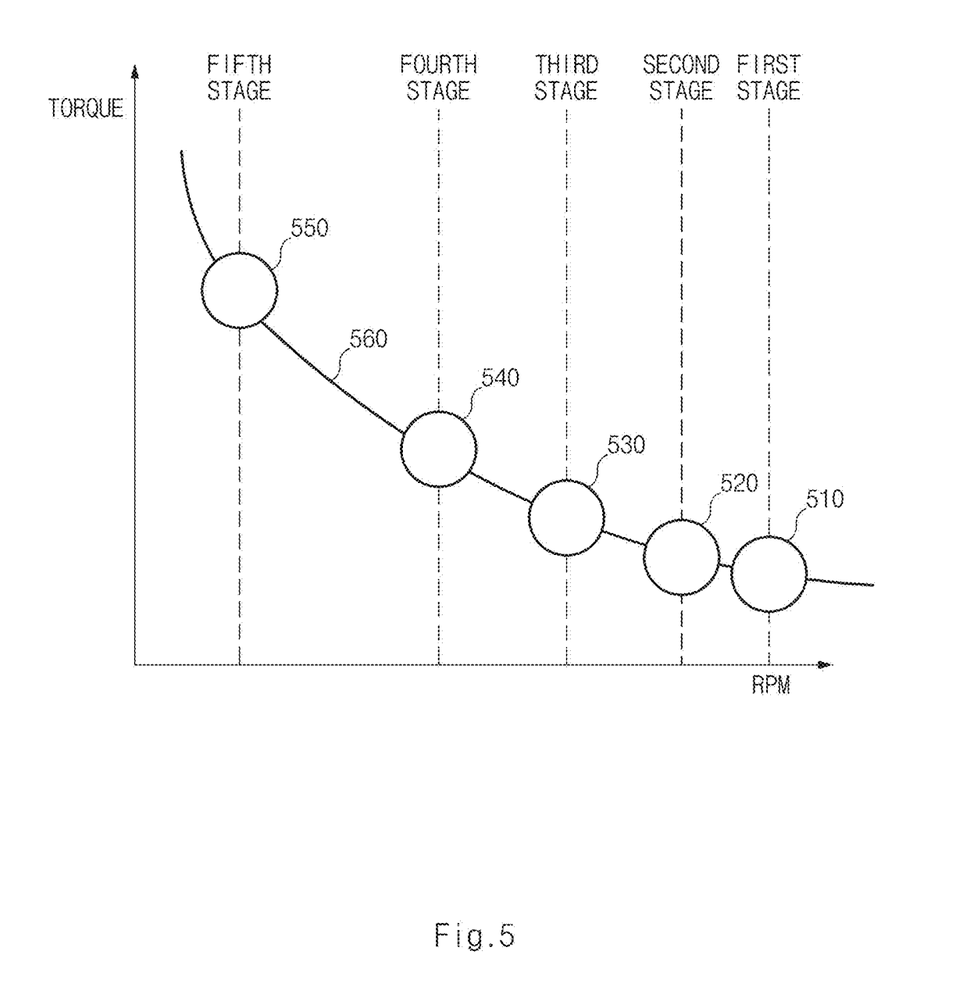
FIG. 5 is a drawing illustrating a power graph generated by a controller provided in an apparatus for controlling shifting of a vehicle according to an embodiment of the present disclosure.

FIG. 5 is a drawing illustrating a power graph generated by a controller provided in an apparatus for controlling shifting of a vehicle according to an embodiment of the present disclosure.

As shown in FIG. 5, a controller 22 provided in the apparatus for controlling the shifting of the vehicle according to an embodiment of the present disclosure may generate a power graph representing a demand power (e.g., 100 kW) as an RPM and a torque of a power source for each gear stage.

In FIG. 5, the horizontal axis indicates the RPM of the power source and the vertical axis indicates the torque of the power source. Reference numeral '510' is the point representing the demand power of 100 kW as the torque and the RPM in the first stage. Reference numeral '520' is the point representing the demand power of 100 kW as the torque and the RPM in the second stage. Reference numeral '530' is the point representing the demand power of 100 kW as the torque and the RPM in the third stage. Reference numeral '540' is the point representing the demand power of 100 kW as the torque and the RPM in the fourth stage. Reference numeral '550' is the point representing the demand power of 100 kW as the torque and the RPM in the fifth stage. In this case, a line connecting the points 510 to 550 is referred to as a power graph 560.

Figure 6:
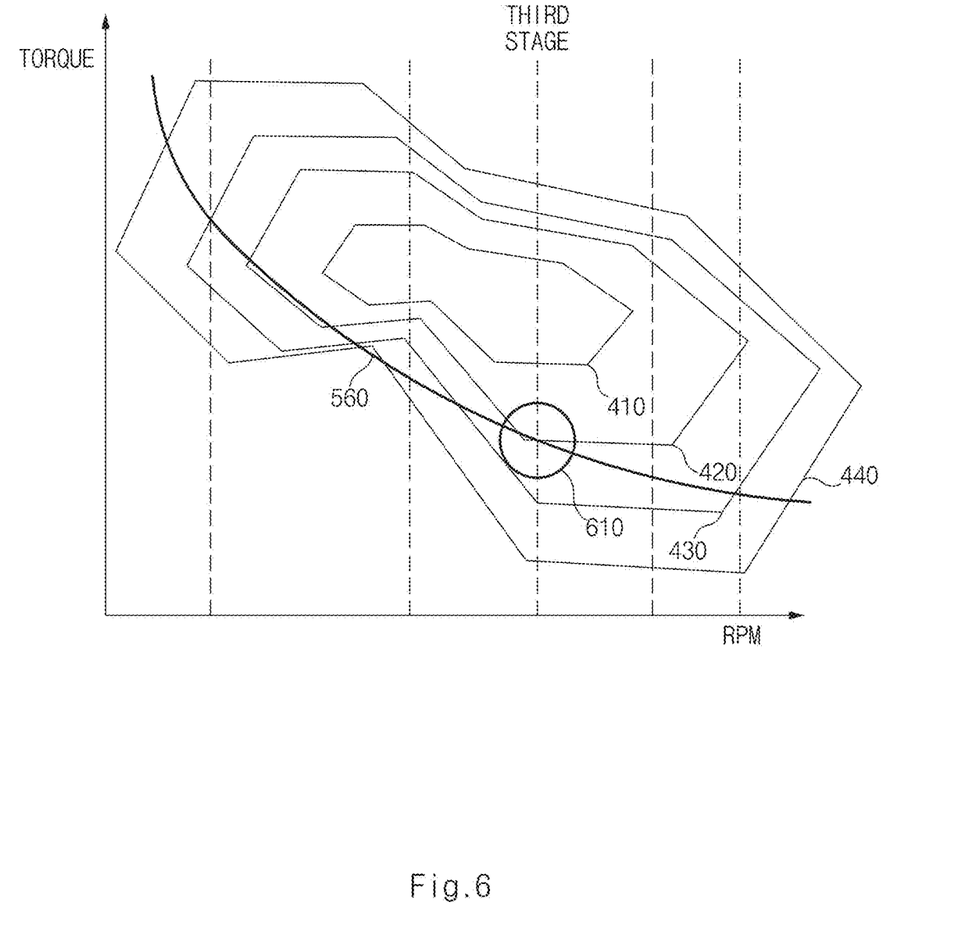
FIG. 6 is a drawing illustrating a process of detecting a gear stage which consumes minimum energy in a controller provided in an apparatus for controlling shifting of a vehicle according to an embodiment of the present disclosure.

As shown in FIG. 6, the controller 22 may match the graph shown in FIG. 5 with an energy consumption map of the power source stored in a storage 21 of FIG. 2 to detect a gear stage which consumes minimum energy.

FIG. 6 is a drawing illustrating a process of detecting a gear stage which consumes minimum energy in a controller provided in an apparatus for controlling shifting of a vehicle according to an embodiment of the present disclosure.

As described with reference to FIG. 4, energy is low in an order of the first energy graph 410, the second energy graph 420, the third energy graph 430, and the fourth energy graph 440 (in an order of graphs indicating low energy). A controller 22 of FIG. 2 may determine whether the first energy graph 410 having the lowest energy, the second energy graph 420, the third energy graph 430, and the fourth energy graph 440 are overlapped with a power graph 560. When there is the overlapped energy graph, the controller 22 may determine whether the energy graph is overlapped in any gear stage.

Referring to FIG. 6, as the first energy graph 410 is not overlapped with the power graph 560, the controller 22 may not detect a gear stage in conjunction with the first energy graph 410.

It may be seen that the second energy graph 420 having the next lowest energy is accurately overlapped with the power graph 560 in the third stage (see reference numeral 610). Thus, the controller 22 may detect the third stage as a gear stage which consumes minimum energy.

In addition, because the third energy graph 430 is overlapped with the power graph 560 in the fifth stage, but is higher in energy than the second energy graph 420, the controller 22 may not select the fifth stage as a gear stage.

Meanwhile, the controller 22 may detect an upshift situation or a downshift situation through the above-mentioned process. In an embodiment, the controller 22 may calculate a potential power ratio to prevent busy shifting, i.e., excessive shifting, in the downshift situation and may maintain a current gear stage or may control shifting to a lower gear stage, based on the calculated potential power ratio. In this case, the controller 22 may shift the vehicle to a gear stage below one stage from the current gear stage, a gear stage below two stages from the current gear stage, a gear stage below three stages from the current gear stage, a gear stage below four stages from the current gear stage, or the like. Herein, the potential power ratio $R_{PP}$ may be the ratio of a demand power $P_{DEM}$ to a maximum power $P_{MAX}$ in a current RPM, which may be represented as Equation 1 below.

$$R_{PP} = \frac{P_{DEM}}{P_{MAX}}\bigg|_{current\ RPM} \quad \text{[Equation 1]}$$

Hereinafter, the process of preventing busy shifting in the controller 22 is described in detail with reference to FIGS. 7 and 8.

Figure 7:
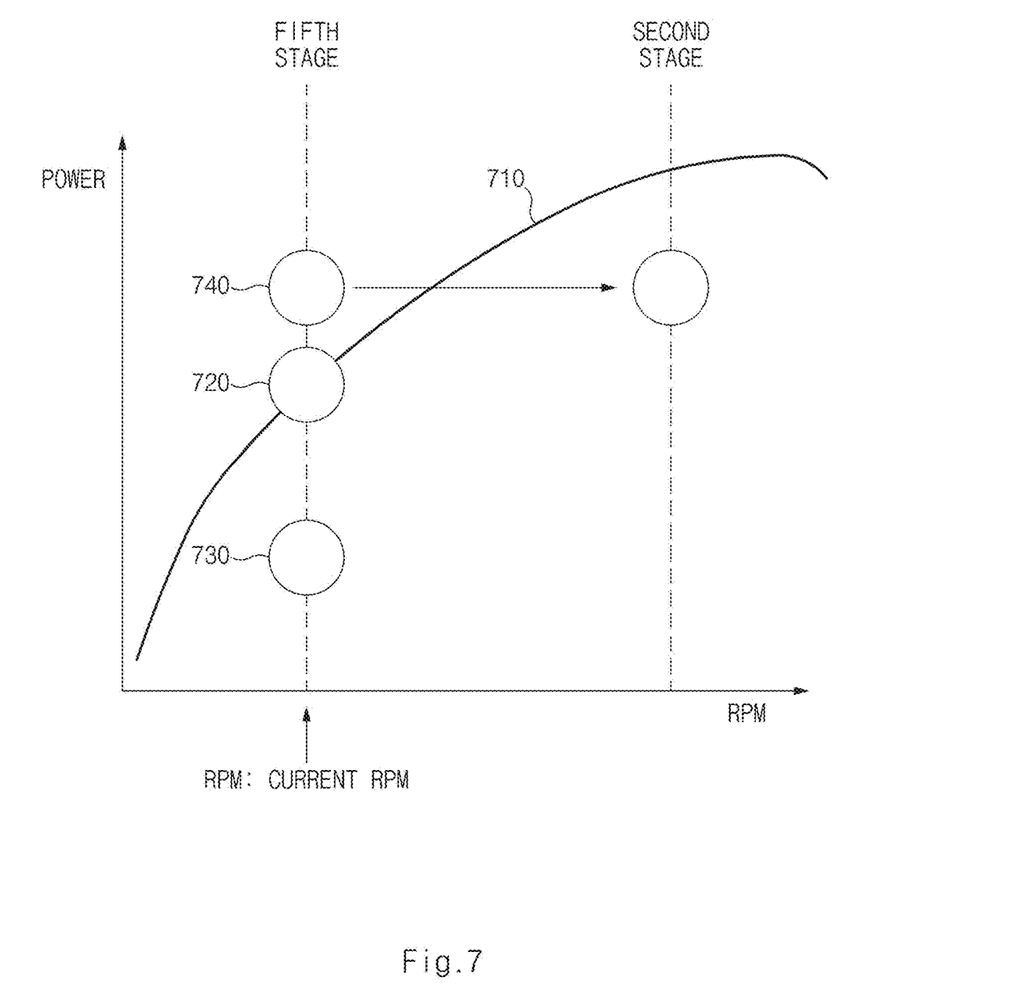
FIG. 7 is a drawing illustrating a process of preventing busy shift in a controller provided in an apparatus for controlling shifting of a vehicle according to an embodiment of the present disclosure.

FIG. 7 is a drawing illustrating a process of preventing busy shifting in a controller provided in an apparatus for controlling shifting of a vehicle according to an embodiment of the present disclosure. The horizontal axis indicates the RPM of the power source and the vertical axis indicates the power.

In FIG. 7, reference numeral '710' indicates the maximum power curve of the power source, reference numeral '720' indicates the maximum power in the current RPM, reference numeral '730' indicates the first demand power, and reference numeral '740' indicates the second demand power.

As shown in FIG. 7, for the first demand power 730, a controller 22 of FIG. 2 may not permit a downshift (e.g., kickdown) of a gear stage, because the potential power ratio $R_{PP}$ is not greater than a threshold (e.g., 1).

For the second demand power 740, the controller 22 may permit a one-stage downshift (e.g., kickdown) of the gear stage, because the potential power ratio $R_{PP}$ is greater than the threshold (e.g., 1). For example, when the current gear stage is a fifth stage, the controller 22 may permit a shift to a fourth stage. In this case, when the potential power ratio $R_{PP}$ is greater than a threshold (e.g., 1.7), the controller 22 may permit a downshift of one stage or more of the gear stage. For example, when the current gear stage is the fifth stage, the controller 22 may permit a shift to a second stage.

Figure 8:
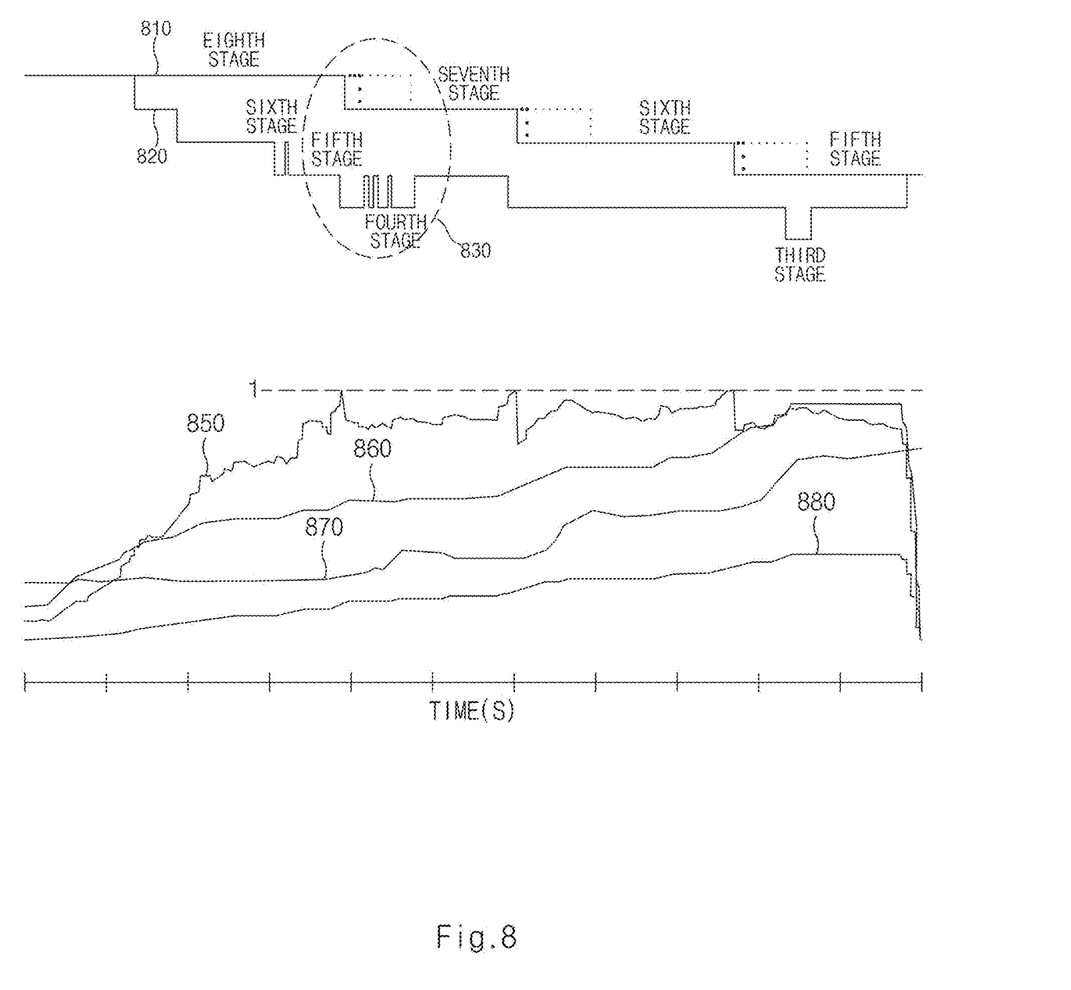
FIG. 8 is a drawing illustrating performance of an apparatus for controlling shifting of a vehicle according to an embodiment of the present disclosure.

FIG. 8 is a drawing illustrating performance of an apparatus for controlling shifting of a vehicle according to an embodiment of the present disclosure.

In FIG. 8, reference numeral '810' indicates the shift state of the vehicle according to an embodiment of the present disclosure and reference numeral '820' indicates the shift state of the vehicle according to an existing manner. Reference numeral '830' indicates that the gear stage is down-shifted (is shifted from an eighth stage to a seventh stage) without busy shifting in the manner 810 according to an embodiment of the present disclosure. Reference numeral '830' also indicates that a busy shift phenomenon where a process of being shifted from a fifth stage to a fourth stage and being shifted to the fifth stage is repeatedly performed occurs in the existing manner 820.

Furthermore, reference numeral '850' indicates the potential power ratio, reference numeral '860' indicates the APS value (the amount of accelerator pedal), reference number '870' indicates the engine RPM, and reference numeral '880' indicates the demand power.

Figure 9:
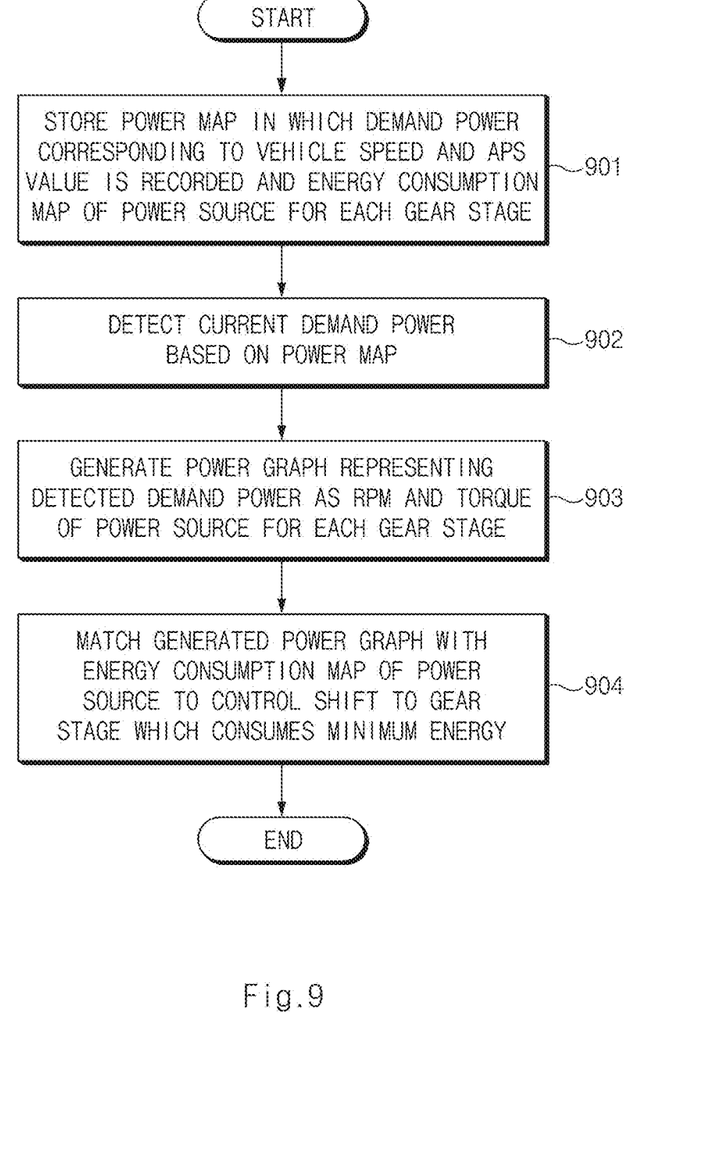
FIG. 9 is a flowchart illustrating a method for controlling shifting of a vehicle according to an embodiment of the present disclosure.

FIG. 9 is a flowchart illustrating a method for controlling shifting of a vehicle according to an embodiment of the present disclosure.

First of all, in operation 901, a storage 21 of FIG. 2 may store a power map in which a demand power corresponding to a vehicle speed and an APS value is recorded and an energy consumption map of a power source for each gear stage.

In operation 902, a controller 22 of FIG. 2 may detect a current demand power based on the power map.

In operation 903, the controller 22 may generate a power graph representing the detected demand power as an RPM and a torque of the power source for each gear stage.

In operation 904, the controller 22 may match the generated power graph with the energy consumption map of the power source to control shifting to a gear stage which consumes minimum energy.

Figure 10:
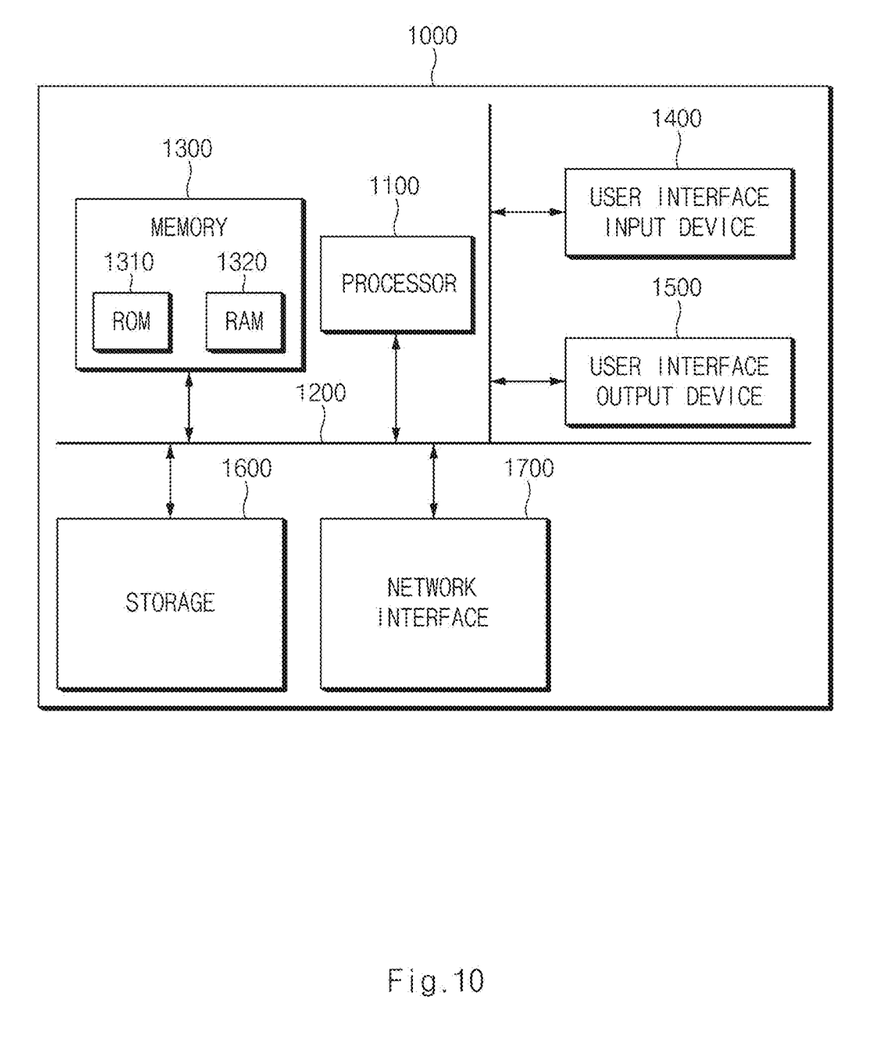
FIG. 10 is a block diagram illustrating a computing system for executing a method for controlling shifting of a vehicle according to an embodiment of the present disclosure.

FIG. 10 is a block diagram illustrating a computing system for executing a method for controlling shifting of a vehicle according to an embodiment of the present disclosure.

Referring to FIG. 10, the above-mentioned method for controlling the shifting of the vehicle according to an embodiment of the present disclosure may be implemented by means of the computing system. A computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (i.e., the memory 1300 and/or the storage 1600) such as a RAM, a flash memory, a ROM, an EPROM, an EEPROM, a register, a hard disk, a SSD (Solid State Drive), a removable disk, and a CD-ROM. The storage medium may be coupled to the processor, and the processor may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The apparatus for controlling the shifting of the vehicle and the method therefor according to an embodiment of the present disclosure may be provided to detect a current demand power based on a map in which a demand power corresponding to a vehicle speed and an accelerator position sensor (APS) value is recorded. The apparatus and method may be also provided to generate a graph representing the detected demand power as a revolution per minute (RPM)

and a torque of a power source for each gear stage. The apparatus and method may be also provided to match the generated graph with an energy consumption map of the power source to control shift to a gear stage which consumes minimum energy. Thus, the apparatus and method may prevent a busy shifting phenomenon without the necessity of having a plurality of shift patterns.

Hereinabove, although the present disclosure has been described with reference to specific embodiments and the accompanying drawings, the present disclosure is not limited thereto. The present disclosure may be variously modified and altered by those having ordinary skill in the art to which the present disclosure pertains without departing from the spirit and scope of the present disclosure claimed in the following claims.

Therefore, the embodiments of the present disclosure are provided to explain the spirit and scope of the present disclosure, but not to limit them. Thus, the spirit and scope of the present disclosure is not limited by the embodiments. The scope of the present disclosure should be construed on the basis of the accompanying claims and all the technical ideas within the scope equivalent to the claims should be included in the scope of the present disclosure.

What is claimed is:

1. An apparatus for controlling shifting of a vehicle, the apparatus comprising:
    a storage storing a power map in which a demand power corresponding to a vehicle speed and an accelerator position sensor (APS) value is recorded and storing an energy consumption map of a power source for each gear stage; and
    a controller configured to detect a current demand power based on the power map, generate a power graph representing the detected demand power as a revolution per minute (RPM) and a torque of the power source for each gear stage, and match the generated power graph with the energy consumption map of the power source to control a shift to a gear stage which consumes minimum energy.

2. The apparatus of claim 1, wherein the controller maintains a current gear stage or finally controls a shift to a lower gear stage, based on a potential power ratio indicating the ratio of the demand power to a maximum power at a current RPM, before controlling the shift to the gear stage which consumes the minimum energy.

3. The apparatus of claim 2, wherein the controller calculates the potential power ratio in a downshift situation.

4. The apparatus of claim 3, wherein the controller maintains the current gear stage, when the potential power ratio is not greater than a first threshold Th1.

5. The apparatus of claim 3, wherein the controller controls a shift to a gear stage below one stage from the current gear stage, when the potential power ratio is greater than a first threshold Th1, and controls a shift to a gear stage below at least two stages from the current gear stage, when the potential power ratio is greater than a second threshold Th2 (where Th1<Th2).

6. The apparatus of claim 1, wherein the power map includes at least one of (i) a graph indicating a relationship between the vehicle speed and the demand power, when the APS value is 5%, (ii) a graph indicating a relationship between the vehicle speed and the demand power, when the APS value is 10%, (iii) a graph indicating a relationship between the vehicle speed and the demand power, when the APS value is 20%, (iv) a graph indicating a relationship between the vehicle speed and the demand power, when the APS value is 40%, (v) a graph indicating a relationship between the vehicle speed and the demand power, when the APS value is 60%, (vi) a graph indicating a relationship between the vehicle speed and the demand power, when the APS value is 80%, or (vii) a graph indicating a relationship between the vehicle speed and the demand power, when the APS value is 100%.

7. The apparatus of claim 6, wherein the controller generates a graph corresponding to a third APS value located between a first APS value and a second APS value, based on a graph corresponding to the first APS value and a graph corresponding to the second APS value.

8. The apparatus of claim 1, wherein the energy consumption map of the power source includes a plurality of energy graphs which indicate different energies without being overlapped with each other.

9. A method for controlling shift of a vehicle, the method comprising:
    storing, by a storage, a power map in which a demand power corresponding to a vehicle speed and an accelerator position sensor (APS) value is recorded and an energy consumption map of a power source for each gear stage;
    detecting, by a controller, a current demand power based on the power map;
    generating, by the controller, a power graph representing the detected demand power as a revolution per minute (RPM) and a torque of the power source for each gear stage; and
    matching, by the controller, the generated power graph with the energy consumption map of the power source to control a shift to a gear stage which consumes minimum energy.

10. The method of claim 9, wherein the controlling of the shift includes:
    maintaining a current gear stage or finally controlling a shift to a lower gear stage, based on a potential power ratio indicating the ratio of the demand power to a maximum power at a current RPM, before controlling the shift to the gear stage which consumes the minimum energy.

11. The method of claim 10, wherein the final controlling of the shift includes:
    calculating the potential power ratio in a downshift situation;
    maintaining the current gear stage, when the potential power ratio is not greater than a first threshold Th1; and
    controlling a shift to a gear stage below one stage from the current gear stage, when the potential power ratio is greater than the first threshold Th1.

12. The method of claim 11, wherein the final controlling of the shift further includes:
    controlling a shift to a gear stage below at least two stages from the current gear stage, when the potential power ratio is greater than a second threshold Th2 (where Th1<Th2).

13. The method of claim 9, wherein the power map includes at least one of (i) a graph indicating a relationship between the vehicle speed and the demand power, when the APS value is 5%, (ii) a graph indicating a relationship between the vehicle speed and the demand power, when the APS value is 10%, (iii) a graph indicating a relationship between the vehicle speed and the demand power, when the APS value is 20%, (iv) a graph indicating a relationship between the vehicle speed and the demand power, when the APS value is 40%, (v) a graph indicating a relationship between the vehicle speed and the demand power, when the APS value is 60%, (vi) a graph indicating a relationship between the vehicle speed and the demand power, when the APS value is 80%, or (vii) a graph indicating a relationship between the vehicle speed and the demand power, when the APS value is 100%.

14. The method of claim 13, further comprising:
generating, by the controller, a graph corresponding to a third APS value located between a first APS value and a second APS value, based on a graph corresponding to the first APS value and a graph corresponding to the second APS value.

15. The method of claim 9, wherein the energy consumption map of the power source includes a plurality of energy graphs which indicate different energies without being overlapped with each other.

\* \* \* \* \*